United States Patent
Heher et al.

(10) Patent No.: US 12,453,935 B2
(45) Date of Patent: Oct. 28, 2025

(54) FILTER SYSTEM AND METHOD

(71) Applicant: Transportation IP Holdings, LLC, Norwalk, CT (US)

(72) Inventors: Brett Heher, Pittsburgh, PA (US); Douglas Lee Locke, Cranberry Township, PA (US); Jennifer Coyne, Franklin Park, PA (US); John E. Barnes, Norwalk, CT (US)

(73) Assignee: Transportation IP Holdings, LLC, Norwalk, CT (US)

( * ) Notice: Subject to any disclaimer, the term of this patent is extended or adjusted under 35 U.S.C. 154(b) by 432 days.

(21) Appl. No.: 18/041,840

(22) PCT Filed: Aug. 18, 2021

(86) PCT No.: PCT/US2021/046413
§ 371 (c)(1),
(2) Date: Feb. 16, 2023

(87) PCT Pub. No.: WO2022/040254
PCT Pub. Date: Feb. 24, 2022

(65) Prior Publication Data
US 2023/0311042 A1    Oct. 5, 2023

Related U.S. Application Data

(60) Provisional application No. 63/068,122, filed on Aug. 20, 2020.

(51) Int. Cl.
| | |
|---|---|
| *B01D 45/12* | (2006.01) |
| *A62B 23/02* | (2006.01) |
| *B01D 45/16* | (2006.01) |
| *B01D 50/00* | (2022.01) |
| *B03C 3/15* | (2006.01) |
| *B33Y 80/00* | (2015.01) |

(52) U.S. Cl.
CPC .............. *B01D 45/16* (2013.01); *A62B 23/02* (2013.01); *B01D 45/12* (2013.01); *B01D 50/00* (2013.01); *B03C 3/15* (2013.01); *B33Y 80/00* (2014.12)

(58) Field of Classification Search
CPC ......... B01D 45/12; B01D 45/16; B01D 50/00
See application file for complete search history.

(56) References Cited

U.S. PATENT DOCUMENTS 4,466,817 A * 8/1984 Faas .......................... F01N 1/12
  55/455
7,559,965 B2    7/2009 Oh et al.
(Continued)

FOREIGN PATENT DOCUMENTS

CN    105597460 A    5/2016
DE    102007020717 A1    11/2008
(Continued)

OTHER PUBLICATIONS

International Preliminary Report on Patentability for corresponding Application No. PCT/US2021/046413 dated Feb. 16, 2023 (6 pages).
(Continued)

*Primary Examiner* — Robert A Hopkins
(74) *Attorney, Agent, or Firm* — K&L Gates LLP

(57) ABSTRACT

A filter system includes a body having an inlet and an outlet fluidly coupled with the inlet by one or more passageways. The one or more passageways are shaped to direct a fluid having particles through the body from the inlet toward the outlet. The one or more passageways may rotate the fluid in one or more cyclonic directions. A lattice component is disposed within the passageways and includes one or more openings through which the fluid passes as the fluid moves in the one or more cyclonic directions. The passageways are shaped to remove a first portion of the particles from the
(Continued)

fluid, and the lattice component is shaped to remove a second portion of the particles from the fluid such that the fluid exiting from the body via the outlet has fewer of the particles than when the fluid entered the body via the inlet.

20 Claims, 12 Drawing Sheets

(56) References Cited

U.S. PATENT DOCUMENTS

| | | |
|---|---|---|
| 2009/0265883 A1 | 10/2009 | Reed, Jr. et al. |
| 2013/0255203 A1 | 10/2013 | Muenkel et al. |
| 2018/0036746 A1 | 2/2018 | Antomon et al. |
| 2020/0206672 A1 | 7/2020 | Vallejo et al. |

FOREIGN PATENT DOCUMENTS

| | | | | |
|---|---|---|---|---|
| KR | 20190004406 A | * | 1/2019 | ............ F24F 11/70 |
| WO | 2012137655 A1 | | 10/2012 | |

OTHER PUBLICATIONS

International Search Report and Written Opinion for corresponding Application No. PCT/US2021/046413 dated Dec. 9, 2021 (10 pages).

Extended European Search Report or corresponding EP Application No. 21859017.2 dated Feb. 15, 2024 (8 pages).

* cited by examiner

FILTER SYSTEM AND METHOD

CROSS-REFERENCE TO RELATED APPLICATIONS

This application is a national stage entry of International Patent Application No. PCT/US21/46413 entered pursuant to 35 U.S.C. § 371, which was filed Aug. 18, 2021, and which claims priority to U.S. Provisional Application No. 63/068,122, filed Aug. 20, 2020. The entire disclosures of these applications are incorporated by reference herein in its entirety.

BACKGROUND

Technical Field

The subject matter described relates to filter systems and methods.

Discussion of Art

Filter or filtration systems, such as respiratory filter systems, may be used to reduce an amount of particles from being received or consumed by a subject, or to reduce an amount of particles being expelled by the subject from entering the atmosphere. For example, filter systems, such as face masks, may be used by medical professionals, industrial workers, service workers, or the like. The size of particles that may be disposed within a fluid, such as air, may range from about 0.01 microns to sizes greater than 1 micron. As one example of a filter system, inertial filtration systems are successful with removing particles have a size greater than 1 micron from a fluid, such as air. However, inertial filtration systems are less successful with removing particles have a size less than 1 micron from the fluid, such as, for example, particles of a size of about 0.3 microns.

Additionally, known filtration systems that may remove a sufficient amount of particles from a fluid are disposable or single-use filters. A sufficient supply of single-use filtration systems may be difficult and costly to maintain. Accordingly, it may be desirable to have a filter system and method that differs from those that are currently available.

BRIEF DESCRIPTION

In one or more embodiments of the subject matter describe herein, a filter system includes a body having an inlet and an outlet fluidly coupled with the inlet by one or more passageways within the body. The one or more passageways are shaped to direct a fluid having particles through the body from the inlet toward the outlet. The one or more passageways may rotate the fluid in one or more cyclonic directions between the inlet and the outlet. A lattice component is disposed within the one or more passageways. The lattice component includes one or more openings through which the fluid passes as the fluid moves in the one or more cyclonic directions within the body from the inlet to the outlet. The one or more passageways are shaped to remove a first portion of the particles from the fluid, and the lattice component is shaped to remove a second portion of the particles from the fluid such that the fluid exiting from the body via the outlet has fewer of the particles than when the fluid entered the body via the inlet.

In one or more embodiments of the subject matter describe herein, a method may include directing a fluid having particles through a body from in inlet toward and outlet fluidly coupled with the inlet by one or more passageways within the body. The one or more passageways may rotate the fluid in one or more cyclonic directions between the inlet and the outlet. The fluid may be directed through a lattice component having one or more openings. The fluid may move through the one or more openings in the one or more cyclonic directions within the body from the inlet toward the outlet. The one or more passageways may be shaped to remove a first portion of the particles from the fluid, and the lattice component may be shaped to remove a second portion of the particles from the fluid such that the fluid exiting from the body via the outlet has fewer of the particles than when the fluid entered the body via the inlet.

In one or more embodiments of the subject matter described herein, a filter system includes a body having an inlet and an outlet fluidly coupled with the inlet by one or more passageways within the body. The one or more passageways may be shaped to direct a fluid having particles through the body from the inlet toward the outlet. The one or more passageways may rotate the fluid in one or more cyclonic directions between the inlet and the outlet. A lattice component may be disposed within the one or more passageways. The lattice component may have plural lattice walls defining one or more openings through which the fluid passes as the fluid moves in the one or more cyclonic directions within the body from the inlet to the outlet. The plural lattice walls may be shaped to control a size of the one or more openings between consecutive lattice walls of the plural lattice walls. The one or more passageways may be shaped to remove a first portion of the particles from the fluid, and the lattice component may be shaped to remove a second portion of the particles from the fluid such that the fluid exiting from the body via the outlet has fewer of the particles than when the fluid entered the body via the inlet. The one or more passageways and the lattice component may remove at least 95% of the particles from the fluid such that the fluid exiting the outlet contains 5% of the particles relative to the fluid entering the inlet.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a filter, filtration systems and methods. The filter systems may be additively manufactured and include cyclonic features and porous or profiled structures. For example, a fluid may be directed into a body of the filter system via an inlet and may be directed out of the body via an outlet. The body may include one or more passageways that are shaped to direct a fluid within the body in one or more cyclonic directions from an inlet toward an outlet. The cyclonic rotation of the fluid may promote particles having a particular size to move toward one or more walls or surfaces of the passageways and separate from the fluid. For example, the passageways of the body results in inertial filtration of particles from the fluid. The filter system may include a lattice component. The porous lattice component may include plural walls that be arranged in a lattice pattern. The size or thickness of the walls may be controlled to control a size of one or more gaps, spaces, or openings between consecutive lattice walls. The fluid may move through the openings of the lattice component within the body. The passageways may be shaped to remove a first portion of the particles from the fluid, and the lattice component may be shaped to remove a second portion of the particles from the fluid. For example, the fluid exiting from the body via the outlet may have fewer particles than when the fluid entered the body via the inlet.

In one or more embodiments, the lattice component may be additively manufactured. Suitable additive manufacturing systems may include a laser printer system. One or more settings of the printer system may control the shape and size (e.g., thickness) of the plural lattice walls. By controlling the size of the plural lattice walls, the size of the openings between consecutive lattice walls may be controlled. For example, the lattice walls may have thickness of about 300 microns. As a result, the one or more openings between consecutive lattice walls may be about 20 microns in at least one direction.

Figure 1:
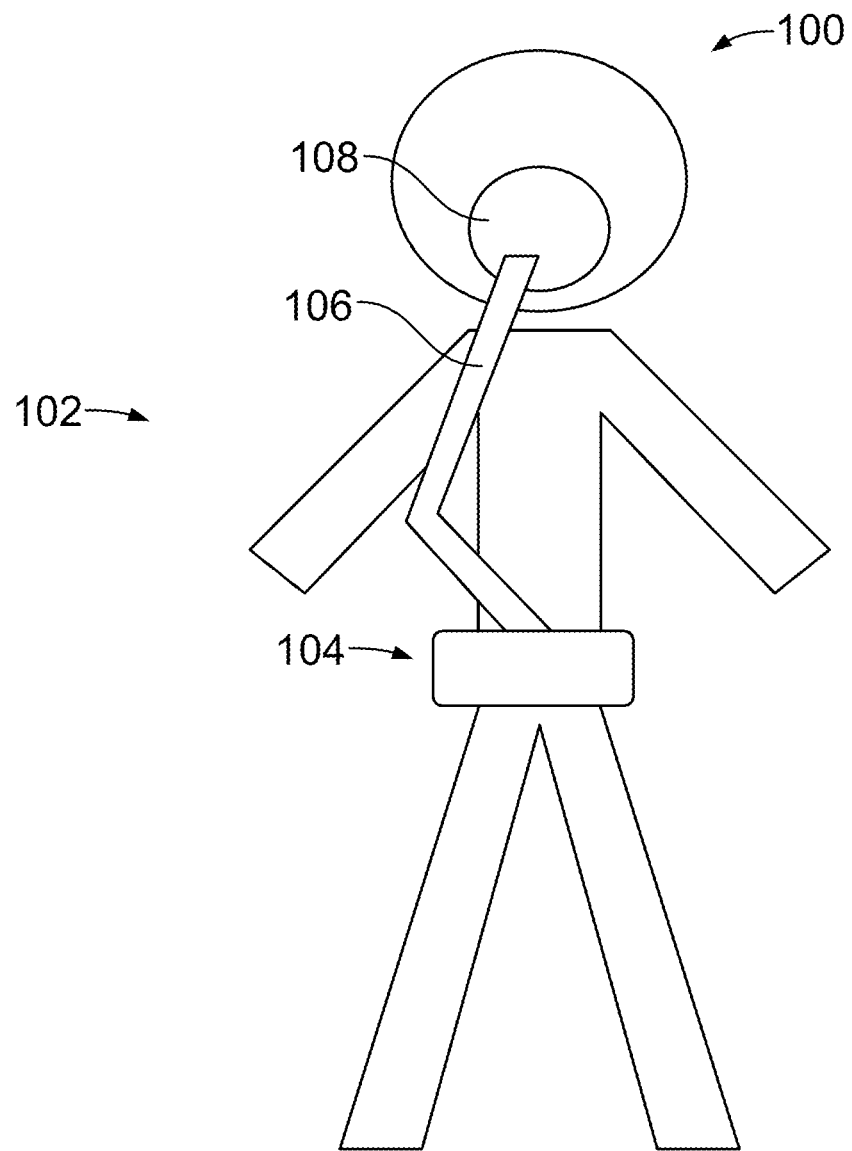
FIG. 1 illustrates a subject using a filter system assembly including a filter system in accordance with one embodiment.

FIG. 1 illustrates a filter system assembly 100 in accordance with one embodiment. The filter system assembly includes a filter system 104, a mask 108, and a conduit 106 extending between the filter system and the mask. The filter system assembly may be used and/or operated by a subject 102. In the illustrated embodiment of FIG. 1, the subject is a human subject, but alternatively the filter system may be used by an animal subject.

In one or more embodiment, the filter system assembly may be a portable system such that the filter system assembly may be untethered, and the user or operator may be able to move the assembly from one location to another. Additionally, the illustrated embodiment of FIG. 1 illustrates the filter system being worn by the subject at a position proximate a waist or midsection of the subject. For example, the filter system may include or be coupled with one or more fastening mechanisms, such as straps, that may be coupled with the subject by wrapping around the waist of the subject. Additionally or alternatively, the filter system may be coupled with the subject at or around an arm or leg of the subject, may be coupled with a hat or other helmet device, may be disposed within or coupled with a shoe, a glove, or any alternative garment that may be worn or otherwise carried by the subject. In one or more embodiments, the filter assembly may be transferable from a first position to a second position. For example, the filter assembly may be disposed on a transferrable device, such as a cart, a gurney, a cane, or the like, and may be moved by movement of the transferrable device.

Figure 2:
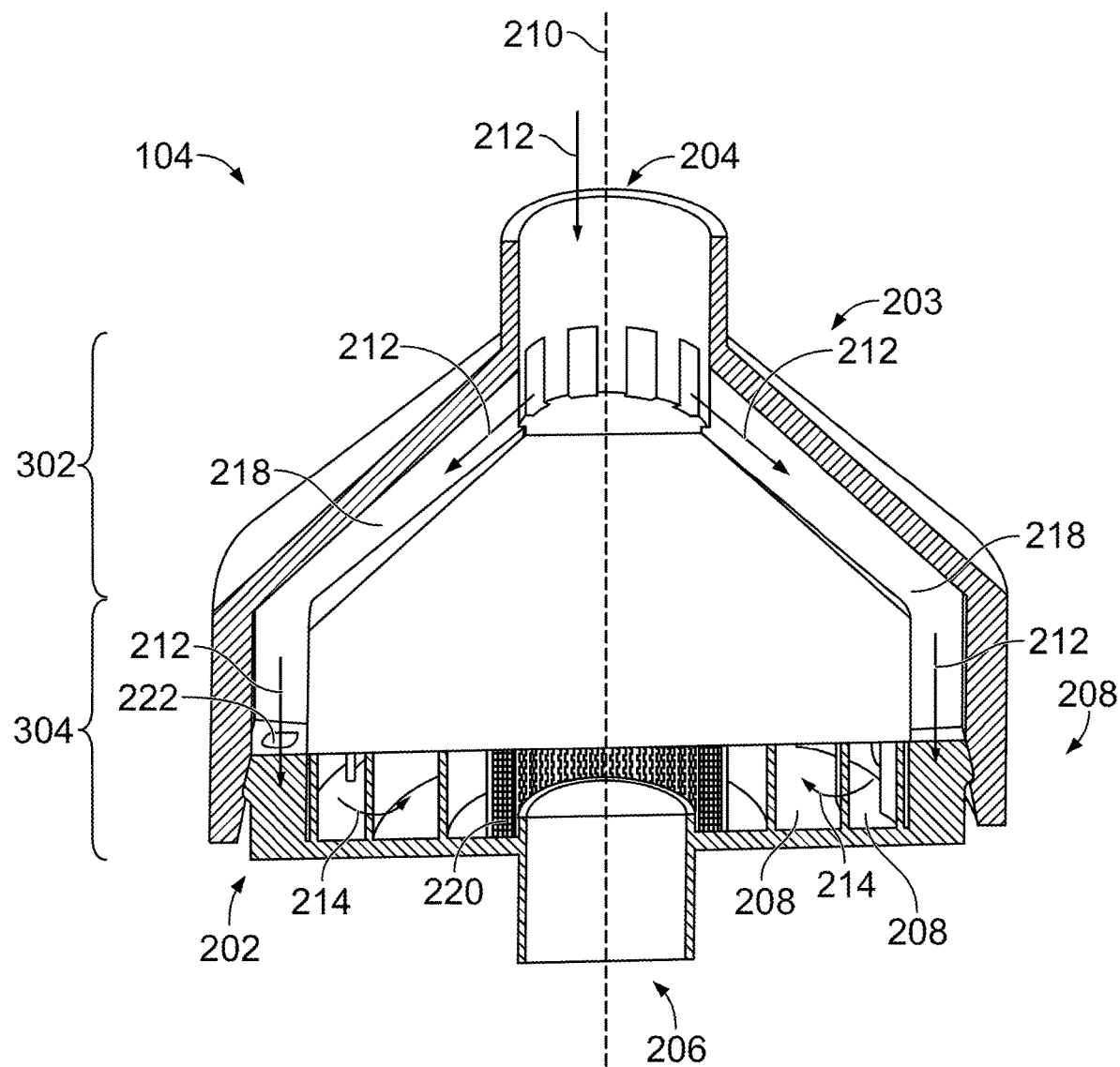
FIG. 2 illustrates a cross-sectional view of a filter system shown in FIG. 1.

FIG. 2 illustrates a cross-sectional view of the filter system 104 in accordance with one embodiment. The filter system includes a body 202 that is operably coupled with a cap 203. The cap includes an inlet 204 that is fluidly coupled with one or more conduits or passages 218 that direct a fluid 212 into the filter system and toward the body. The inlet is fluidly coupled with an outlet 206. The passages are fluidly coupled with the body via one or more holes or openings 222. In one or more embodiments, the body and the cap may be formed as a unitary component, or the body may have a shape and/or configuration that does not require the cap being coupled with the body. The cap and the body are elongated along a central axis 210. In the illustrated embodiment of FIG. 2, the inlet of the cap has a substantially circular cross-sectional shape, and the outlet has a substantially cross-sectional shape that is substantially concentric with the inlet. A cross-sectional size of a first portion 302 of the cap continuously increases along the central axis between the inlet and the outlet, and a cross-sectional size of a second portion 304 of the cap is substantially uniform along the central axis. Alternatively, the cap may have an alternative shape and/or size. For example, the cross-sectional area may increase in steps along the central axis, may gradually increase along the first and second portions, may be substantially constant along the first portion and may include gradual and/or step increases in size within the second portion, or any combination therein. Optionally, the body of the filter system may have any alternative shape and/or size.

The plural conduits or passages 218 direct a fluid 212 into the filter system and within the body of the filter system. The passages may be defined and/or enclosed by one or more walls or surfaces within the body. In the illustrated embodiment of FIG. 2, the passages are disposed proximate the exterior of the cap such that the passages direct the fluid 212 in two or more directions from the inlet and along the exterior perimeter of the cap along the first and second portions of the cap. Alternatively, the passages may direct the fluid in any alternative direction.

The passages are fluidly coupled with one or more passageways 208 of the body by the one or impingement holes or openings 222 of the body. The passageways include one or more surfaces that direct the fluid in one or more cyclonic directions 214. The fluid moves through the passageways in the one or more cyclonic directions toward the outlet of the body. Prior to the fluid moving out of the body via the outlet, the fluid moves through a lattice component 220 that is disposed within the one or more passageways. The lattice component includes one or more openings through which the fluid passes as the fluid moves within the body and toward the outlet.

Figure 3:
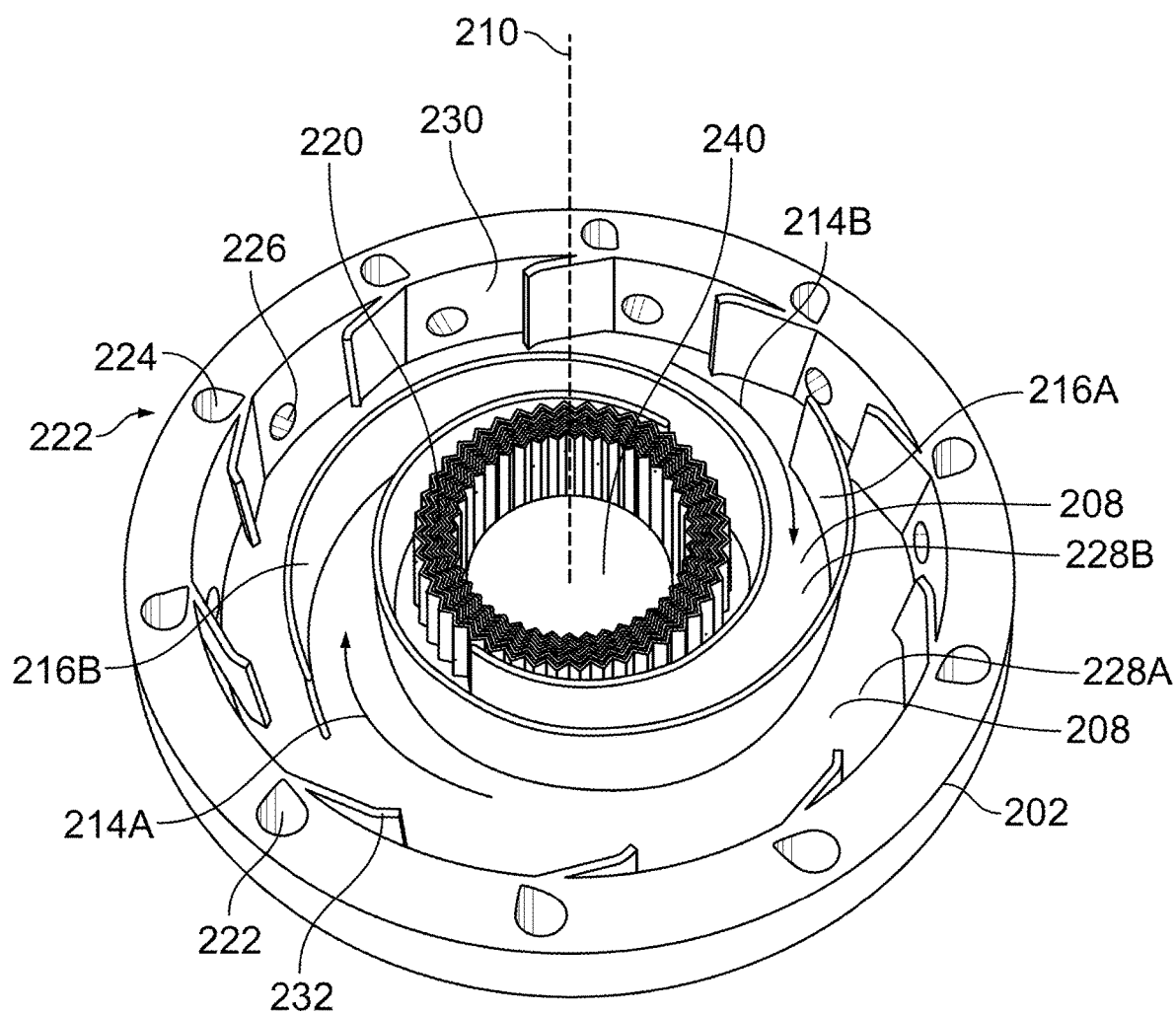
FIG. 3 illustrates a perspective view of the filter system shown in FIG. 2.

FIG. 3 illustrates a top perspective view of the filter system 104 shown in FIG. 2 with the cap removed. The fluid is directed from the passages 218 (shown in FIG. 2) to the passageways 208 via the one or more openings 222 that fluidly couple the passages with the passageways. Each opening includes an inlet 224 fluidly coupled with the passages, and an outlet 226 fluidly coupled with the passageways such that the holes direct the fluid into the passageways. The passageways are defined by plural walls 216A, 216B that are shaped to rotate the fluid in the one or more cyclonic directions 214. In the illustrated embodiment, a portion of the fluid moves in the cyclonic direction 214A along a first circular pathway 228A and another portion of the fluid moves in the cyclonic direction 214B along a second circular pathway 228B. The fluid is directed along the first and second circular pathways in a cyclonic direction toward the outlet of the body and toward the center axis 210. The circular pathways are shaped to form a cyclonic structure that changes non-cyclonic flow of the fluid entering the body into cyclonic flow of the fluid in the one or more cyclonic directions. In one or more embodiments, the circular pathways and/or the passageways may be referred to as directional vanes, directional conduits, or the like.

In one or more embodiments, the body may include walls and/or surfaces that may define three or more different circular pathways of the fluid. Additionally or alternatively, the three or more different circular pathways may be shaped to control an amount of the fluid that may be directed into each of the different circular pathways. For example, the passageways may be shaped, sized, and/or positioned to control a first amount of the fluid that is directed into a first circular pathway, and control a different, second amount of the fluid that is directed into a second circular pathway. Optionally, a common or substantially same amount of fluid may be directed into two or more circular pathways, and a different amount of the fluid may be directed into one or more other circular pathways.

In one or more embodiments, the passageways may be shaped to control one or more flow characteristics of the fluid. For example, the passageways may be shaped, sized, and/or oriented to control a flow rate of the fluid, a pressure of the fluid at different locations or positions within the body, an amount of turbulence of the fluid, rotational forces within the fluid, or the like. Additionally or alternatively, the passageways may be shaped to control a path length of the fluid, a surface area of the body, surface morphology of one or more different surfaces within the body, a dwell time of the fluid at one or more locations within the body, or the like. In one or more embodiments, one or more surfaces of the body and/or the lattice component may be manufactured of one or more materials to control one or more characteristics of the fluid. Optionally, one or more surfaces of the body and/or the lattice component may be prepared or treated to control one or more characteristics of the fluid.

The fluid is directed in the cyclonic directions 214A, 214B toward the outlet. As the fluid moves toward the outlet of the body, the fluid passes through the one or more openings of the lattice component 220. The lattice component extends from a support 240 disposed at a first end (or bottom side) of the component and a second end (or top side) of the component along the central axis 210. The lattice component will be discussed in more detail below.

The fluid may include plural particles disposed within and moving through the body with the fluid. The particles may have a distribution of different sizes. For example, some of the particles may have diameters less than 0.1 microns, some particles may have diameters less than 1 micron, a portion of the particles may have diameters less than 20 microns, a portion of the particles may have diameters less than 100 microns, or the like. The particles may be and/or include bacteria, fungal spores, pollen, irradiated dust, and the like.

As the fluid moves through the body, the particles within the fluid are separated from the fluid. The passageways may be shaped to remove a first portion of the particles from the fluid. For example, the rotational forces generated or caused by the passageways directing the fluid in the cyclonic directions cause the first portion of the particles to separate from fluid. In one or more embodiments, the passageways may produce inertial filtration that may cause the first portion of the particles to be removed from the fluid. The first portion of the particles may have a particle size that may be about 1 micron or greater than 1 micron.

The lattice component may be shaped to remove a second portion of the particles from the fluid. As the fluid moves through the one or more openings of the lattice component, the fluid may contact or run into the plural walls of the lattice component that define the one or more openings. For example, the plural walls may cause an increase in turbulence of the fluid as the fluid moves through the lattice component. The second portion of the particles may contact one or more of the walls of the lattice component which may cause the particles to separate from the fluid and couple with the one or more walls. For example, the second portion of the particles may be removed from the fluid and may attach or couple with one or more surfaces of the walls of the lattice component as the fluid moves through the lattice component. The second portion of the particles may have a particle size that may be less than the size of the particles of the first portion of the particles that are removed from the fluid by the passageways. For example, the second portion of the particles may have a particle size that may be less than 1 micron. In another embodiment, the second portion of the particles may a particle size that is less than 0.5 microns. In a more preferred embodiment, the second portion of the particles may have a particle size that is less than 0.3 microns. Optionally, the second portion of the particles may have a distribution of particle sizes from about 0.01 microns to about 1 micron. Optionally, the second portion of the particles may have an alternative distribution of particle sizes.

In one or more embodiments, the body of the filter system including the passageways may be manufactured additively as a single, unitary component. For example, the body may be formed as a unitary body. Additively manufacturing the body allows for the body to be more compact and include one or more internal surfaces relative to manufacturing the body using non-additively manufacturing methods, such as casting, forging, or the like. Additionally, additively manufacturing the body allows the body to have varying three-dimensional shapes, to have multi-domain passages, passageways, conduits, or the like, within the same unitary component. Additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the body, or a portion of the body, can be formed in another manner.

In one or more embodiments, the lattice component may be manufactured additively as a single, unitary component, and may be operably coupled with the unitary component of the body of the filter system. For example, the lattice component may be coupled with the body via a fastening or coupling mechanism, may be press-fit or otherwise held or contained with a portion of one or more of the passageways, or the like. Optionally, a portion of the lattice component may be additively manufactured with the body as a unitary filter system.

The body defining the passageways and the lattice component may be formed or manufactured of a metallic material, a ceramic material, a ceramic metal composite (CMC) material, a plastic material, a composite material, a cermet material, or the like In one or more embodiments, the body and/or the lattice component may be manufactured or otherwise formed of a steel alloy, a copper alloy, an aluminum alloy, a silver alloy, a titanium alloy, a silicon material, a tungsten alloy, a ferrous based material, or the like. Examples of a cermet material may include, but are not limited to, oxides, nitrides, or carbides of the metallic alloys. In one or more embodiments, the body may be manufactured of a first material, and the lattice component may be manufactured of the same material or different materials or different metallic alloys. For example, the body and the lattice component may be manufactured of steel but of different steel alloys, or the like. Optionally, a portion of the body may be manufactured of a steel alloy, and another portion of the body may be manufactured of a copper alloy. Optionally, the body may be manufactured of a steel alloy, and one or more surfaces of the body and/or the passageways may be manufactured of a plastic material and include a metallic coating disposed on a portion of the plastic material.

In one or more embodiments, a portion of the body may be manufactured of a first metal alloy, and one or more portions of the body may be surface treated with a different second metal having a desired functional capability. At least one desired functional capability includes antimicrobial, biostatic, and/or disinfectant capabilities (collectively "antimicrobial"). Suitable metals may include copper, zinc, mercury, lead, iodine, titanium, and silver. The powder may be applied via a wash or anodic bath. For example, a steel or aluminum body may be treated with a copper wash so that an anodic coating may be applied to a surface portion of the body, or the like. A surface treated with, for example, titanium dioxide, may generate ozone particles when exposed to a UV light source. UV light may itself have antimicrobial effects. A cleaning procedure, or an embedded UV LED device, may generate ozone on demand by exposing a treated surface to UV light in one embodiment.

In other embodiments, a portion of the body may be manufactured of a material that may be impregnated with an antimicrobial material, an antifungal material, or the like. A suitable antimicrobial material may include bacteriostatic agents, and may be an agent that kills microorganisms and/or stops or slows the growth of microorganisms such as bacterial or other virus carrying agents. An antifungal material may be used as an agent to reduce an amount of fungi that may grow within the body. Optionally, the body may be manufactured of organic and/or inorganic materials that provide microbicidal and/or biostatic protection to the body. If an additive manufacturing method of, for example, binder jet printing is used, the anti-microbial may be organic (e.g., capable of surviving any additive manufacturing process) and may include one or more phenolic moiety; alcohol moiety; and/or ammonium, ethylenediamine, or amine moiety.

In one or more embodiments, a portion of one or more of the walls 216A, 216B of the passageways may be textured. For example, a first portion of the walls may be textured or have a surface roughness that may be different than a second portion of the walls. For example, the passageways may remove the first portion of the particles from the fluid, the lattice component may remove the second portion of the particles from the fluid, and the textured walls may remove a third portion of the particles from the fluid. The textured first portion of the walls may have a surface area by volume that is greater than a surface area of the non-textured second portion of the walls. Optionally, all of the walls and/or surfaces may be textured to control an amount of the particles that may be removed from the fluid. The texture of the first and second portions of the walls may be caused or formed by a chemical treatment, a printing process, or the like. In one or more embodiments, different areas of surfaces of the body may have or receive different surface treatments. For example, one or more surfaces of the body may be treated with a Lotus effect surface morphology that may repel the fluid away from the surfaces of the body, and other surfaces may have an increased surface area with a hydrophilic surface morphology that may catch and separate some of the particles from the fluid. Optionally, one or more surfaces may be textured or roughened, may include protrusions, or the like, to remove a portion of the particles from the fluid. In one or more embodiments, one or more surfaces may be polished by one or more of a chemical treatment, or parameters of a printing or forming process, or the like.

The passageways may be shaped to remove the first portion of the particles from the fluid and the lattice component may be shaped to remove the second portion of the particles from the fluid. For example, the fluid exiting from the body via the outlet has fewer of the particles than when the fluid entered the body via the inlet. In one or more embodiments, the passageways and the lattice component may remove at least 90% of the particles from the fluid such that the fluid exiting the outlet contains about 10% of the particles relative to the fluid entering the body via the inlet. In a preferred embodiment, the passageways and the lattice component may remove at least 95% of the particles from the fluid such that the fluid exiting the outlet contains about 5% of the particles relative to the fluid entering the body via the inlet. In one or more embodiments, the passageways and the lattice component may remove at least 98% of the particles from the fluid such that the fluid exiting the outlet contains about 2% of the particles relative to the fluid entering the body via the inlet.

In one or more embodiments, the body of the filter system and/or the lattice component may be shaped based on a type of the particles within the fluid, characteristics of the particles within the fluid, or the like. For example, the passageways may have a first size and/or shape based on the particles being of a first type, and the passageways may have a second size and/or shape based on the particles being of a second type.

Figure 4:
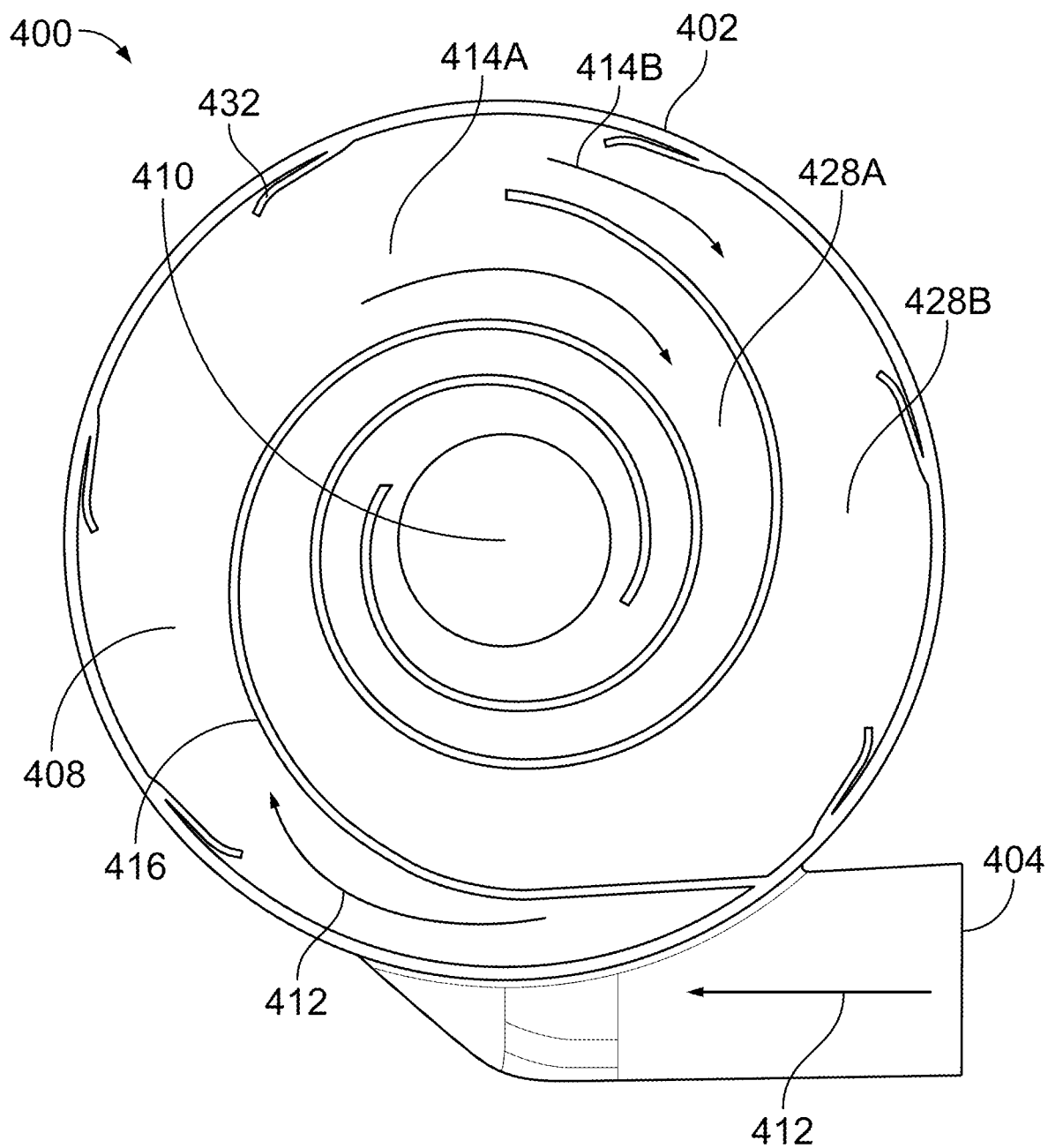
FIG. 4 illustrates a cross-sectional view of a body of a filter system in accordance with one embodiment.

FIG. 4 illustrates a filter system 400 in accordance with one embodiment. The filter system includes a body 402 having an inlet 404 and an outlet (not shown) that is fluidly coupled with the inlet. Unlike the filter system shown in FIGS. 2 and 3, the inlet and the outlet of the filter system 400 do not extend along a central axis 410. Alternatively, the inlet extends in a direction that is substantially perpendicular with the central axis. Fluid 412 is directed into the body via the inlet. The inlet is fluidly coupled with one or more passageways 408 defined by plural walls 416 that are shaped to rotate the fluid in one or more cyclonic directions 414A, 414B about a central axis 410. The passageways are one or more circular pathways 428A, 428B that are shaped to form a cyclonic structure that changes non-cyclonic flow of the fluid entering the body into cyclonic flow of the fluid in the one or more cyclonic directions. In the illustrated embodiment of FIG. 4, the first and second circular pathways are concentric with each other about the central axis.

Figure 5:
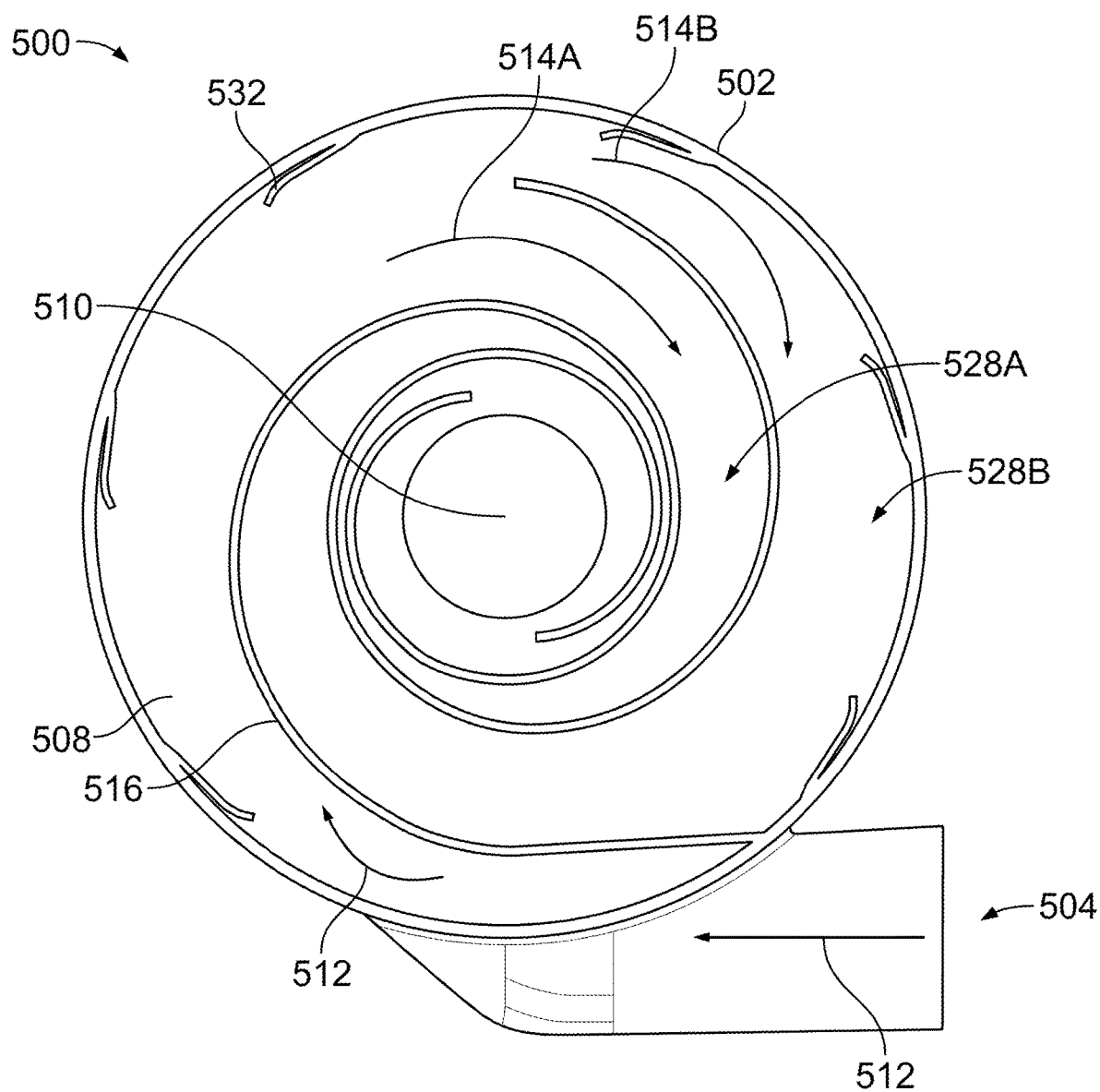
FIG. 5 illustrates a cross-sectional view of a body of a filter system with offset passageways in accordance with one embodiment.

FIG. 5 illustrates a filter system 500 in accordance with one embodiment. The filter system includes a body 502 having an inlet 504 and an outlet (not shown). Like the filter system 400 shown in FIG. 4, the inlet of the filter system 500 extends in a direction substantially perpendicular to a central axis 510. Fluid 512 is directed into the body via the inlet and is rotated in one or more cyclonic directions 514A, 514B about the central axis one or more passageways 508 that are defined by plural walls 516. The passageways are first and second circular pathways 528A, 528B, respectively. Unlike the filter system 400 shown in FIG. 4, the first circular pathway of the filter system is radially offset about the central axis from the second circular pathway. For example, the first and second circular pathways are not concentric with each other about the central axis.

Figure 6:
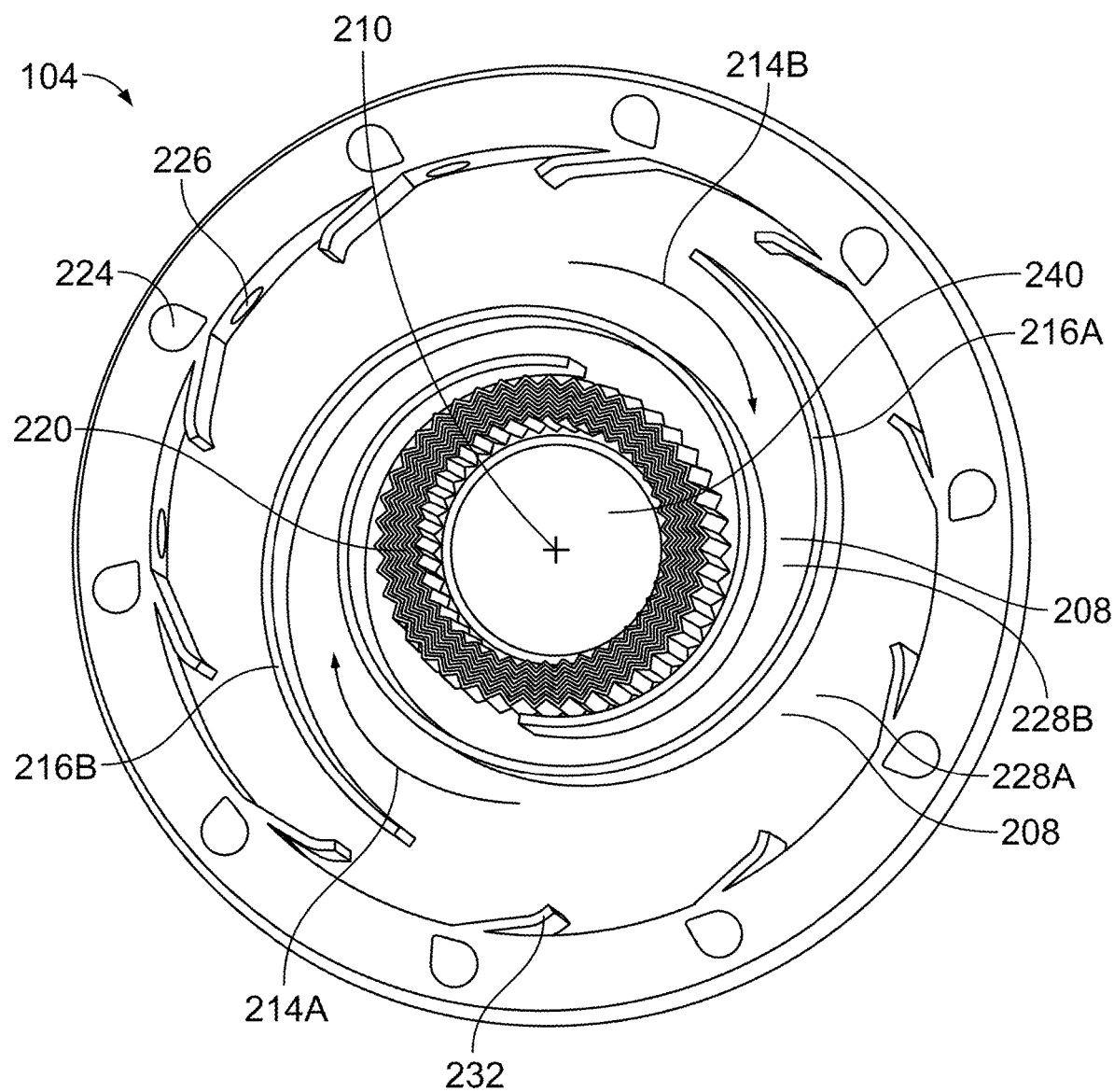
FIG. 6 illustrates a top view of the filter system shown in FIGS. 2 and 3.

FIG. 6 illustrates a top view of the filter system 104 illustrated in FIGS. 2 and 3. The cap has been removed from the filter system. The filter system includes the body 202 and the lattice component 220. In one or more embodiments, the body may include one or more protrusions 232 disposed within the body and extending a distance into the one or more passageways 208. In the illustrated embodiments of FIGS. 3 and 6, the protrusions are operably coupled with an interior surface 230 of the body and extend a distance away from the interior surface. The protrusions may be shaped, sized, and oriented to interfere with the fluid as the fluid moves within the body. For example, the protrusions may direct a portion of the fluid out of the one or more passageways. Additionally or alternatively, one or more protrusions may be operably coupled with an extend a distance away from one or more of the walls 216A, 216B that define the passageways. In one or more embodiments, the protrusions may be referred to as particle traps, or the like. Optionally, one or more surfaces of the body may have a surface roughness or porosity to control an amount of the first portion of the particles removed from the fluid by the fluid moving along the passageways.

Figure 7:
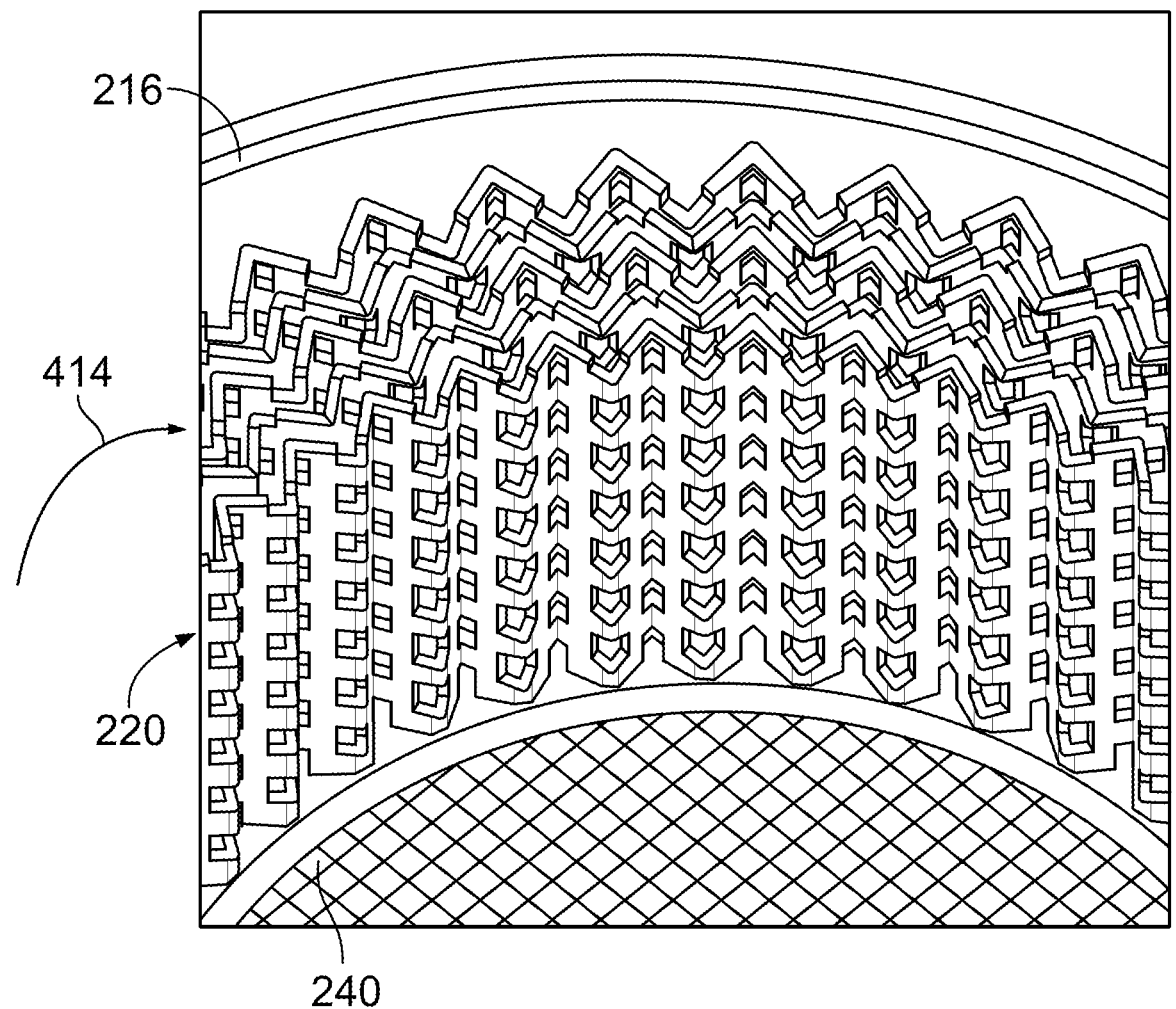
FIG. 7 illustrates a magnified view of a lattice component of the filter system shown in FIG. 6.
Figure 8:
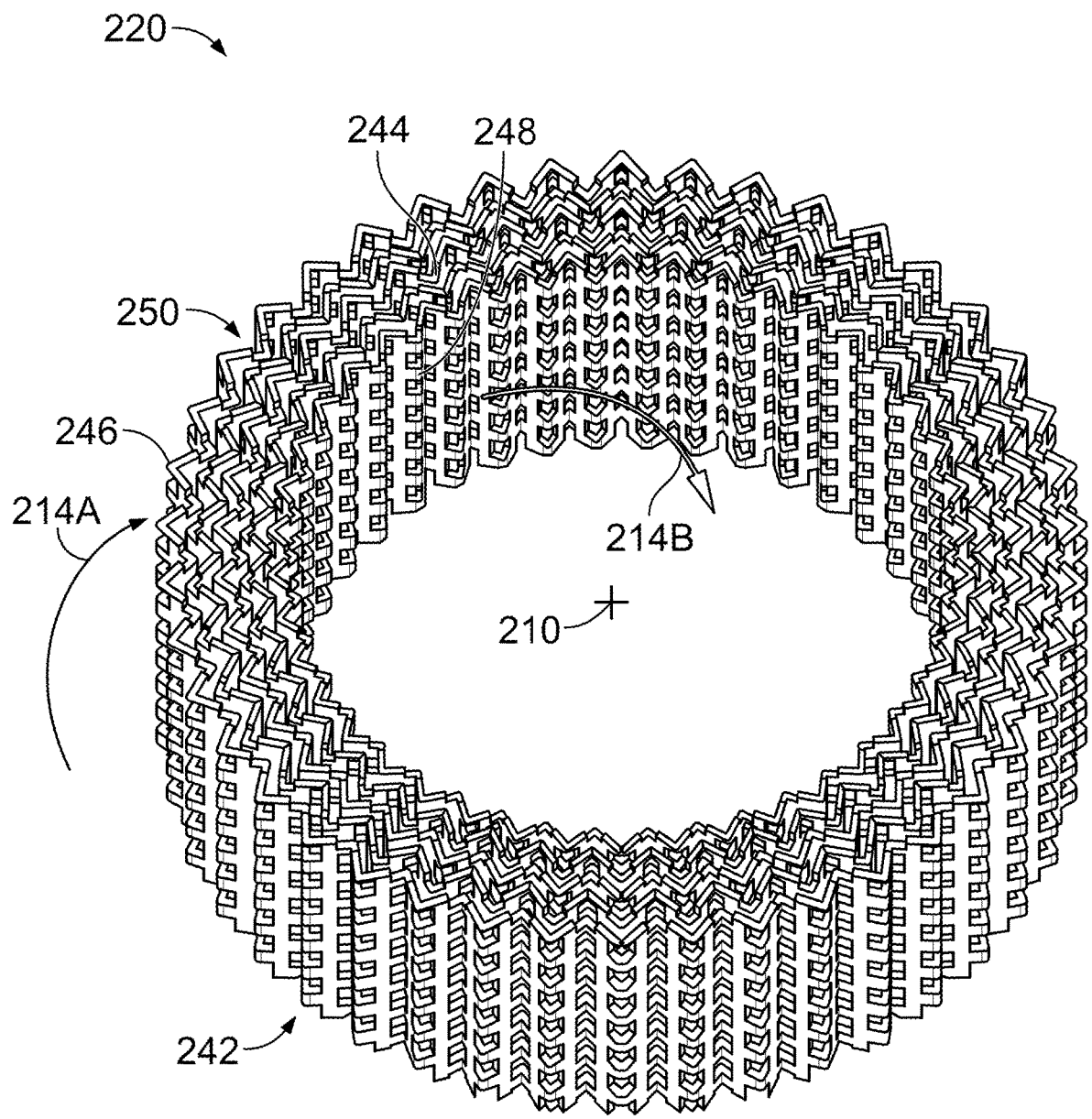
FIG. 8 illustrates a partial magnified view of the lattice component of a filter system in accordance with one embodiment.

FIG. 7 illustrates a magnified view of the lattice component 220 of the filter system shown in FIG. 6. FIG. 8 illustrates a perspective view of the lattice component of the filter system. The lattice component extends between a first end 242 (or bottom side) and a second side 244 (or top side) along the central axis 210, and between an exterior side 246 and an interior side 248 about the central axis. The support 240 is disposed at the first or bottom side of the component.

The lattice component includes plural lattice walls 250. The lattice walls define and/or form one or more openings of the lattice component through which the fluid passes in the cyclonic directions 214. For example, the fluid moves from the passageways into the lattice component in the first cyclonic direction 214A and out of the lattice component in the second cyclonic direction 214B. The plural lattice walls may direct the fluid in one or more directions within and through the lattice component and around the plural lattice walls. For example, as the fluid moves within the lattice component, the fluid may change directions one or more times based on the plural lattice walls, and the one or more openings formed by the plural lattice walls.

In one or more embodiments, the plural lattice walls may be shaped, sized, and/or oriented to control a flow rate of the fluid, a pressure of the fluid at different positions or locations within the lattice component or within the filter system, to control a pressure drop within the filter system, to control an amount of turbulence of the fluid, to control one or more forces generated by the fluid that may be exerted on the plural lattice walls, or the like.

Figure 9:
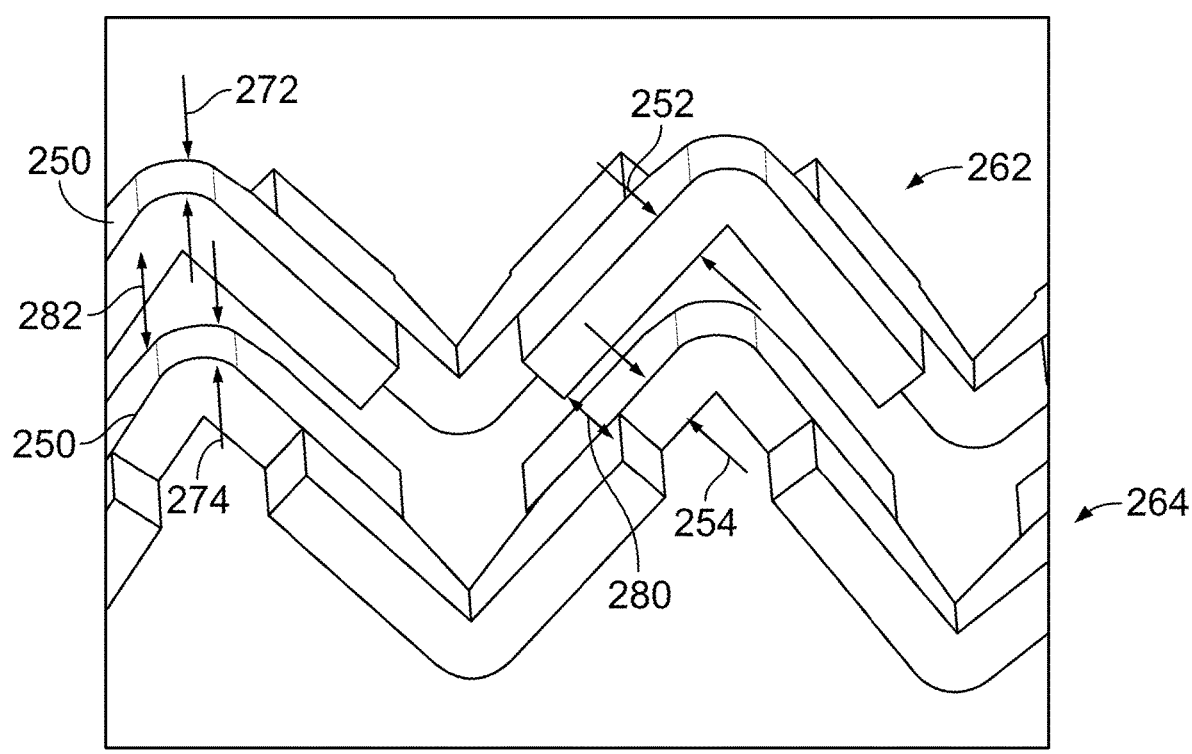
FIG. 9 illustrates a partial magnified view of the lattice component shown in FIG. 8.

FIG. 9 illustrates a partial magnified view of the lattice component shown in FIG. 8. The lattice component includes a first portion of lattice walls 262 and a second portion of lattice walls 264. The first portion of the lattice walls have wall thicknesses 252 in a first direction, and wall thicknesses 272 in a second direction. The second portion of the lattice walls have wall thicknesses 254 in a first direction, and wall thicknesses 274 in a second direction. In the illustrated embodiment, the first and second portions of the lattice walls have substantially uniform wall thicknesses. Alternatively, the first portion may have a wall thickness that is different than a wall thickness of walls of the second portion. In one or more embodiments, the plural lattice walls may have wall thicknesses that are about 300 microns thick. Optionally, one or more portions of the plural lattice walls may have wall thicknesses that may be less than 300 microns thick or may be greater than 300 microns thick.

Figure 11:
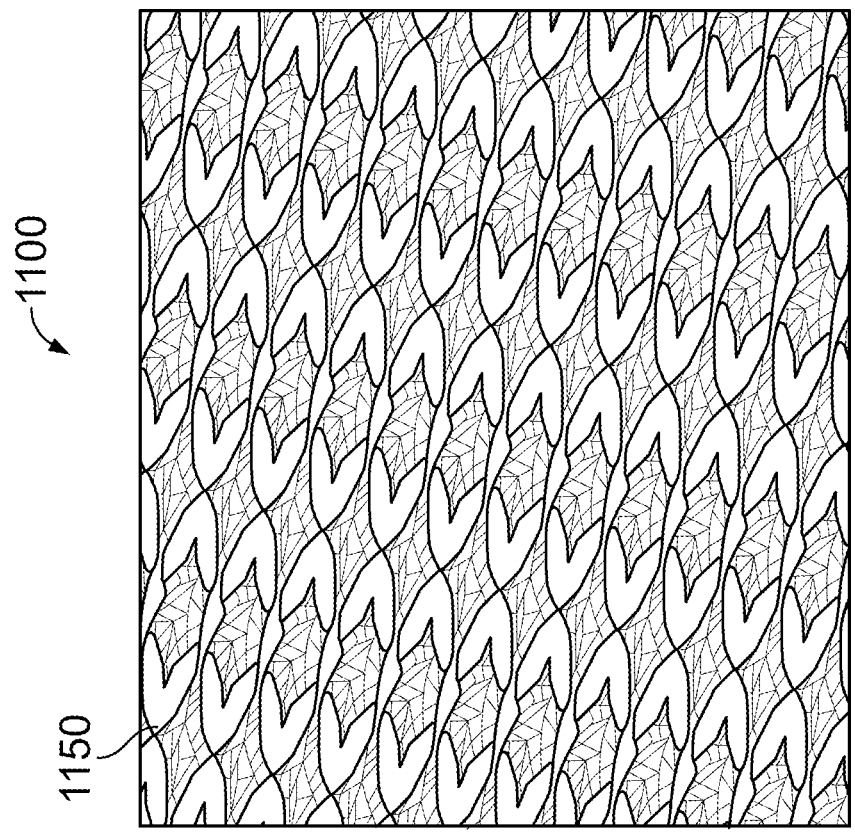
FIG. 11 illustrates a pattern formed by plural lattice walls of a lattice component in accordance with one embodiment.
Figure 10:
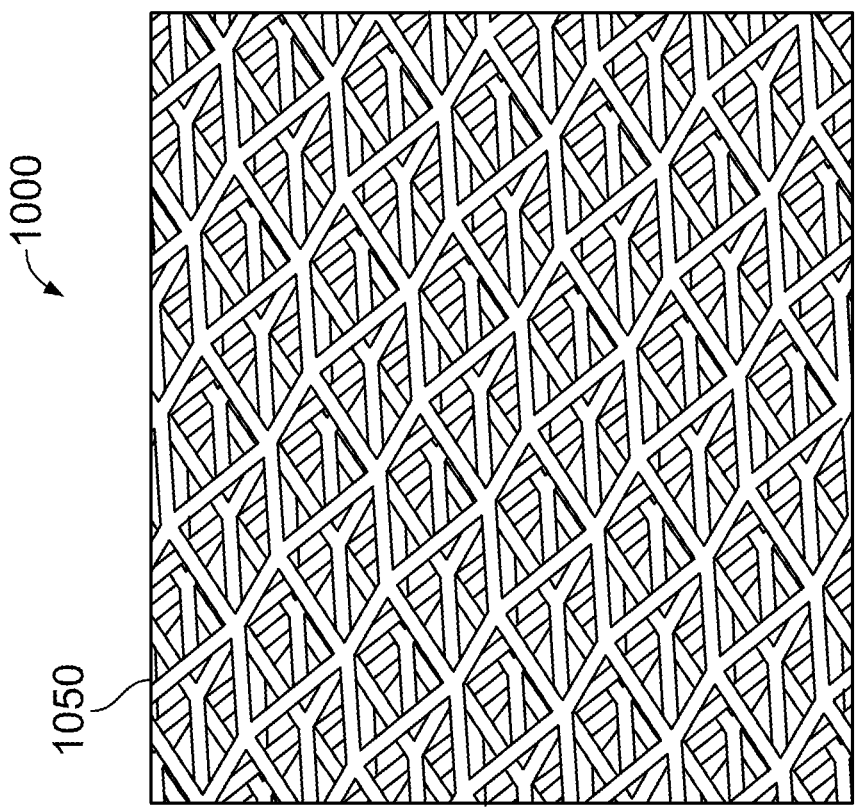
FIG. 10 illustrates a pattern formed by plural lattice walls of a lattice component in accordance with one embodiment.

In the illustrated embodiment, the plural lattice walls of the first portion 262 have a lattice configuration that is substantially the same as a lattice configuration of the second portion 264 of the plural lattice walls. Alternatively, the first portion of the plural lattice walls may have a configuration, shape, and/or size that is different than the configuration of the second portion of the plural lattice walls. For example, FIG. 10 illustrates a lattice pattern 1000 formed by plural lattice walls 1050, and FIG. 11 illustrates a lattice pattern 1100 formed by plural lattice walls 1150 that is different than the lattice pattern 1000. In one or more embodiments, the lattice component may have a lattice pattern, such as the lattice pattern 1000 shown in FIG. 10, in a portion of the lattice disposed proximate the first end of the lattice component, and may have a different, second lattice pattern, such as the lattice pattern 1100 shown in FIG. 11, in a portion of the lattice disposed proximate the second end of the lattice component.

Returning to FIG. 9, the plural lattice walls are shaped to control a size of the one or more openings 280, 282 between consecutive lattice walls. The plural lattice walls may be separated from each other by the openings that have a size in at least one direction less than 80 microns. In another embodiment, the openings may have a size in at least one direction that may be less than 50 microns. In a more preferred embodiment, the openings may have a size in at least one direction that is about 20 microns.

The size of the openings of the lattice component may be controlled by controlling the thicknesses of the walls of the lattice component. In one or more embodiments, the thicknesses of the lattice walls may be controlled by one or more software settings of the computer system controlling the additive manufacturing of the lattice component. The additively manufactured lattice component may include plural lattice walls with one or more openings between the plural lattice walls forming a porous lattice structure. The porous, monolithic structure may be additively manufactured by a laser additive process with apertures have at least one dimension less than 250 microns, or with apertures having a range of sizes from about 20 microns to less than 250 microns.

For example, controlling one or more of the power density, the scan rate, spot size, spot offset size, force, trace spacing, trace spacing relative to a spot size, or the like, of the laser may control the size of the gap or opening between consecutive lattice walls. As one example, the size of gaps or openings between consecutive lattice walls may be changed and/or controlled by offsetting or moving a centerline of a weld bead as the weld bead moves along a printing surface, by changing the power density and/or the scan rate, or the like, during one or more passes of the printing system. Subsequent passes of print area may be at 90 degrees, 45 degrees, or the like, relative to the orientation of a centerline of a first pass of the print area to create a grid of openings of the lattice component. For example, as the lattice component is formed along a z-axis, each laser trace may be at about 45 degrees relative to a previous and/or subsequent laser trace, each laser trace may be indexed by about 45 degrees, or the like, The centerline of the weld bead, the power density, or the scan rate of the printing system may be changed to form spaces or openings between consecutive lattice walls that may be substantially square in cross-sectional shape, that may be elongated in one direction, such as slots, or the like.

In one or more embodiments, the thickness of the plural lattice walls may create the one or more openings that have a size in at least one direction of about 20 microns. Optionally, the size of the openings may be controlled based on a ratio between the wall thickness to the size of the opening. For example, a portion of lattice walls having a first wall thickness may form openings having a size of about 20 microns, however a second portion of lattice walls having a smaller, second wall thickness may be unable to form openings having a size of about 20 microns. Optionally, the size of the opening may a fraction or percentage of a size of a weld bead, such as a weld bead width, may be a fraction of a laser beam width, or the like.

Returning to FIG. 7, the support 240 disposed at or proximate the first end 242 of the lattice component. The support may be a porous structure including a lattice or web-like configuration. In one or more embodiments, the lattice pattern or confirmation of the support may be different than the lattice pattern of the lattice component. The fluid moves through the passageways of the body, through the lattice component, and through the openings of the support toward the outlet of the body.

Figure 12:
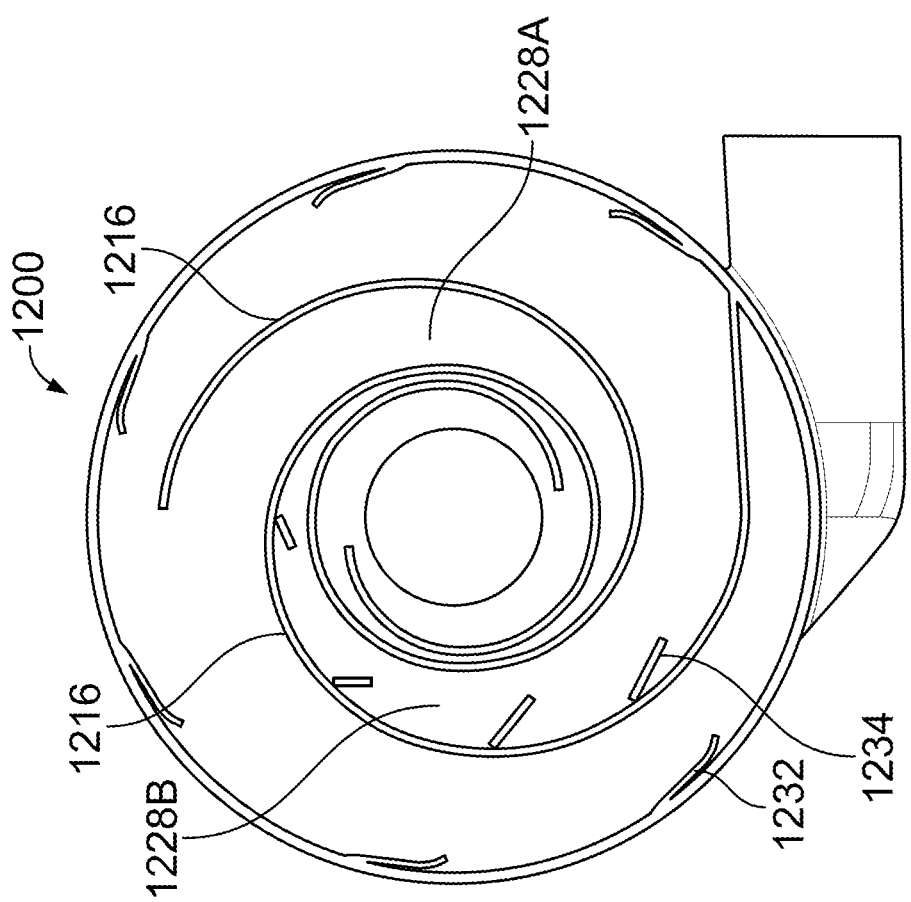
FIG. 12 illustrates a filter system including protrusions for interfering with a fluid within the filter system in accordance with one embodiment.

FIG. 12 illustrates a filter system 1200 in accordance with one embodiment. Like the filter system 500 shown in FIG. 5, circular pathways 1228A, 1228B of the filter system formed by walls 1216 are radially offset from each other. The filter system may include one or more protrusions 1232 operably coupled with a surface of the body, and one or more protrusions 1234 operably coupled with one or more of the walls 1216 that define the circular pathways.

Figure 13:
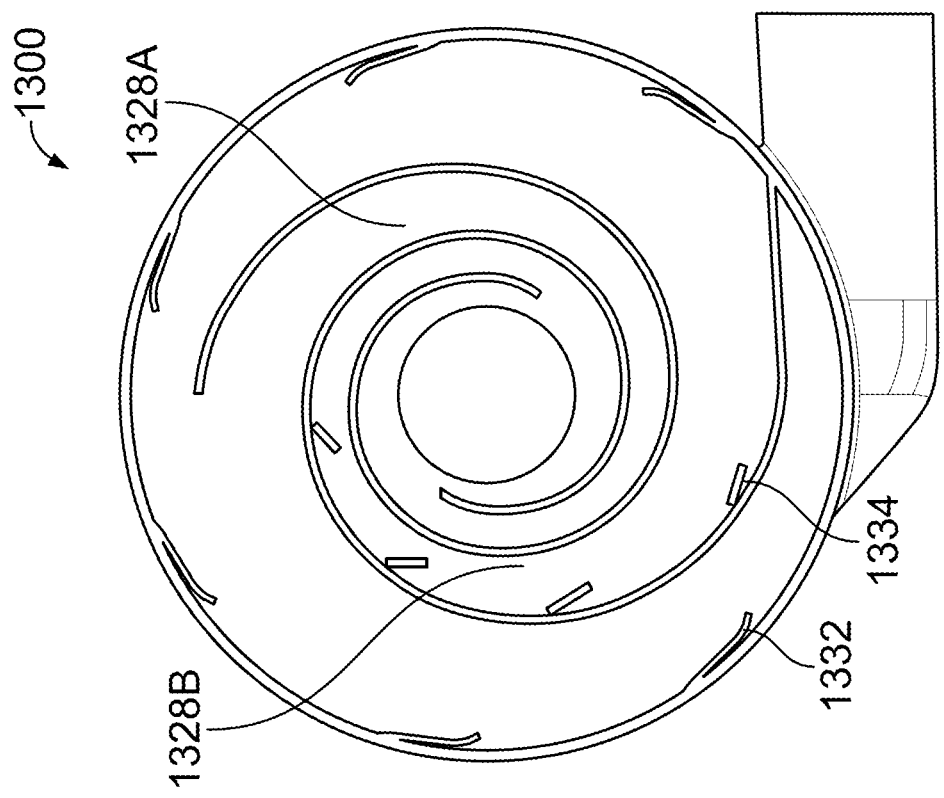
FIG. 13 illustrates a filter system with offset pathways and including protrusions for interfering with a fluid in accordance with one embodiment.

Optionally, FIG. 13 illustrates a filter system 1300 in accordance with another embodiment. Like the filter system 1200 shown in FIG. 12, the filter system includes plural protrusions 1332 operably coupled with a surface of the body, and one or more protrusions 1334 operably coupled with one or more of the walls 1316 that define first and second circular pathways 1328A, 1328B, respectively. Additionally, like the filter system 400 shown in FIG. 4, the first circular pathway is concentric with the second circular pathway.

Figure 14:
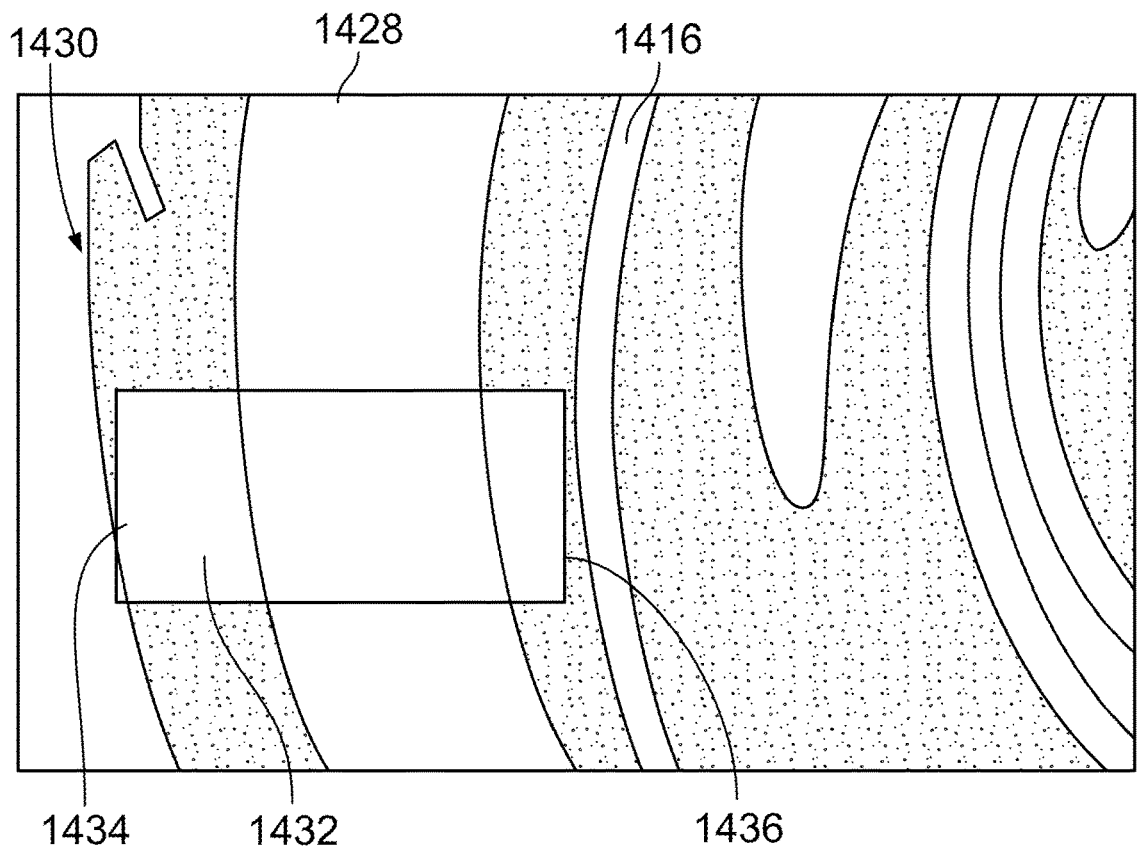
FIG. 14 illustrates a protrusion of a filter system in accordance with one embodiment.

FIG. 14 illustrates an example of a protrusion 1432 of a filter system in accordance with one embodiment. The protrusion may be disposed within a circular pathway 1428 of the filter system. The protrusion may be a porous structure that extends between a first end 1434 and a second end 1436. The first end is operably coupled with a surface 1430 of a body of the filter system, and the second end is operably coupled with a wall or surface 1416, such as a wall or surface that may define the circular pathway of the filter system. For example, the fluid may move or pass through the porous structure of the protrusion as the fluid moves within the body and along the circular pathway in a cyclonic direction.

Figure 15:
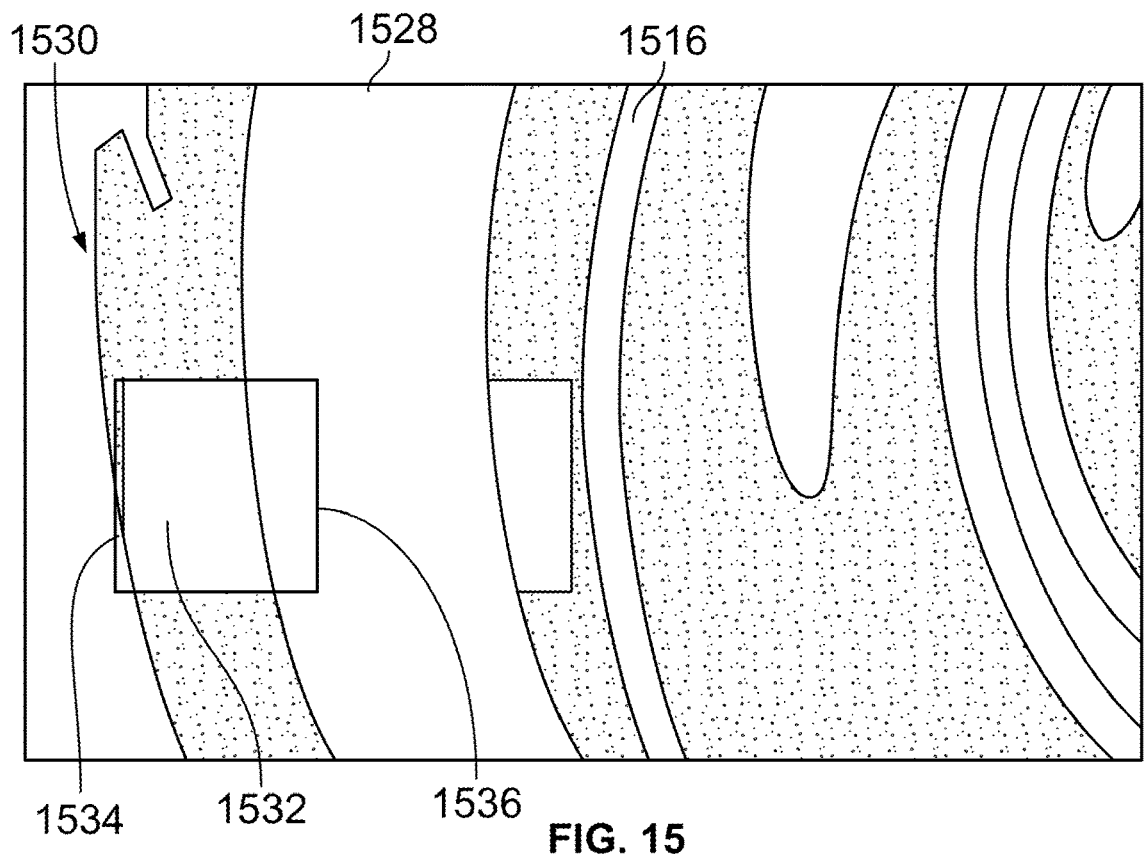
FIG. 15 illustrates a protrusion of a filter system in accordance with one embodiment.

FIG. 15 illustrates another example of a protrusion 1532 of a filter system. The protrusion may be disposed within a circular pathway 1528 of the filter system. Like the protrusion 1432 shown in FIG. 14, the protrusion may be a porous structure that extends between a first end 1534 and a second end 1536. The first end may be operably coupled with a surface 1530 of a body of the filter system. The second end may be disposed a distance away from the surface. For example, the second end may not be operably coupled with a wall or surface 1516, such as a wall or surface that define the circular pathway. A portion of the fluid may move or pass through the porous structure of the protrusion, and another portion of the fluid may move between the second end of the protrusion and the wall 1516. Additionally or alternatively, the protrusion may have an alternative shape, size, or orientation. For example, the first end 1534 of the protrusion may have a size that is greater than a size of the second end 1536 of the protrusion, such that the fluid moving through the protrusion proximate the first end may move through a larger porous structure than the fluid moving through the protrusion proximate the second end.

In one or more embodiments, the body and/or the lattice component may receive an electric current from a power source disposed outside of the body. For example, the electric current may change a charge of one or more surfaces of the body, the passageways, the plural lattice walls, or the like. Changing the charge of one or more surfaces of the filter system may increase an attractiveness ionized particles within the fluid toward the one or more surfaces. For example, an increased number of ionized particles may move toward the charged surfaces of the filter system and increase a number of particles removed from the fluid as the fluid moves from the inlet toward the outlet.

In one or more embodiments, the body of the filter system may include one or more holes or openings that may be open passages between an interior of the body and an exterior of the body. The holes or openings may control one or more characteristics of the fluid as the fluid moves within the filter system. The holes or openings may be selectively opened and/or closed. For example, the holes may be closed (e.g., prohibit the fluid from moving out of the body via the holes) while the filter system is in use. Alternatively, the holes may be opened during a cleaning process of the filter system. The holes may be shaped, sized, and positioned to control one or more characteristics of a second fluid as the second fluid moves within the filter system. The second fluid may be directed into and/or out of the body via the inlet, the outlet, or the holes. In one or more embodiments, the filter system may be washed, cleaned, or the like, such that the filter system is a re-usable filter system. Washing or cleaning the filter system may remove the particles that were removed from the fluid by the body and the lattice component during use of the filter system. The second fluid may move through the one or more passageways and the lattice component to clean the filter system. For example, the second fluid may be an antimicrobial fluid, another chemical cleaning agent, may be electromagnetic radiation such as ultraviolet rays, may be a form of forced water or gas, or the like. Optionally, the filter system may be disposed within an autoclave system to clean or disinfect the filter system so that the filter system may be used again.

In one or more embodiments of the subject matter describe herein, a filter system includes a body having an inlet and an outlet fluidly coupled with the inlet by one or more passageways within the body. The one or more passageways are shaped to direct a fluid having particles through the body from the inlet toward the outlet. The one or more passageways may rotate the fluid in one or more cyclonic directions between the inlet and the outlet. A lattice component is disposed within the one or more passageways. The lattice component includes one or more openings through which the fluid passes as the fluid moves in the one or more cyclonic directions within the body from the inlet to the outlet. The one or more passageways are shaped to remove a first portion of the particles from the fluid, and the lattice component is shaped to remove a second portion of the particles from the fluid such that the fluid exiting from the body via the outlet has fewer of the particles than when the fluid entered the body via the inlet.

Optionally, the one or more passageways may be one or more circular pathways shaped to form a cyclone structure that changes non-cyclonic flow of the fluid entering the body into cyclonic flow of the fluid in the one or more cyclonic directions. Optionally, the one or more circular pathways may include two or more of the circular pathways that are concentric with each other about a central axis. Optionally, the one or more circular pathways may include a first circular pathway and a second circular pathway with the first circular pathway radially offset about a central axis from the second circular pathway. Optionally, the filter system may include one or more protrusions disposed within the body and extending a distance into the one or more passageways. The one or more protrusions may interfere with the fluid as the fluid moves within the body. Optionally, the one or more passageways may be defined by one or more walls. A first portion of the one or more walls may be textured to remove a third portion of the particles from the fluid. Optionally, a second a portion of the one or more walls may not be textured to reduce an amount of the first portion of the particles that are removed by the one or more passageways. Optionally, the lattice component may include plural lattice walls between a first end and a second end of the lattice component. The plural lattice walls may direct the fluid in one or more directions through the lattice component and around the plural lattice walls. Optionally, the plural lattice walls may contact the at least the second portion of particles disposed within the fluid to separate the at least the second portion of the particles from the fluid, the at least the second portion of the particles having a size smaller than 1 micron. Optionally, a first portion of the lattice component may include the plural lattice walls in a first lattice configuration, and a second portion of the lattice component may include the plural lattice walls in a second lattice configuration. Optionally, a first portion of the plural lattice walls have a first wall thickness, and a second portion of the plural lattice walls have a second wall thickness that is different than the first wall thickness. Optionally, the plural lattice walls may have a wall thickness that is about 300 microns thick. Optionally, the plural lattice walls may be shaped to control a size of the one or more openings between consecutive lattice walls of the plural lattice walls. Optionally, consecutive walls of the plural lattice walls may be separated from each other by the one or more openings. The one or more openings may have a size in at least one direction of about 20 microns. Optionally, the plural lattice walls of the lattice component may be arranged in a pattern to control the size of the one or more openings between the consecutive walls of the plural lattice walls. Optionally, the one or more passageways within the body may be shaped to control one or more flow characteristics of the fluid. Optionally, the body and the one or more passageways may be additively manufactured as a unitary component. Optionally, the lattice component may be operably coupled with the unitary component. Optionally, the one or more passageways and the lattice component may control a pressure of the fluid at one or more positions within the body between the inlet and the outlet. Optionally, the one or more passageways and the lattice component may remove at least 95% of the particles from the fluid such that the fluid exiting the outlet contains 5% of the particles relative to the fluid entering the inlet. Optionally, the body and the one or more passageways may be manufactured of one or more of a metallic material, a ceramic material, a ceramic metal composite material, a plastic material, a composite material, or a cermet material. Optionally, the body and the one or more passageways may be manufactured of a plastic material and include a metallic coating disposed on a portion of the plastic material. Optionally, one or more of the one or more passageways or the lattice component may receive an electric current from a source disposed outside of the body, wherein the electric current is configured to change a charge of one or more surfaces of the one or more of the one or more passageways or the lattice component. Optionally, the filter system may include one or more holes disposed within the body. The one or more holes may be shaped to control one or more characteristics of the fluid. Optionally, a second fluid may move through the one or more passageways and the lattice component. The one or more holes may be shaped to control one or more characteristics of the second fluid as the second fluid moves through the one or more passageways and the lattice component. Optionally, the second fluid may be directed into the body via one or more of the inlet, the outlet, or the one or more holes, and may be directed out of the body via one or more of the inlet, the outlet, or the one or more holes. Optionally, the filter system may be transferable from a first position to a second position.

In one or more embodiments of the subject matter describe herein, a method may include directing a fluid having particles through a body from in inlet toward and outlet fluidly coupled with the inlet by one or more passageways within the body. The one or more passageways may rotate the fluid in one or more cyclonic directions between the inlet and the outlet. The fluid may be directed through a lattice component having one or more openings. The fluid may move through the one or more openings in the one or more cyclonic directions within the body from the inlet toward the outlet. The one or more passageways may be shaped to remove a first portion of the particles from the fluid, and the lattice component may be shaped to remove a second portion of the particles from the fluid such that the fluid exiting from the body via the outlet has fewer of the particles than when the fluid entered the body via the inlet.

In one or more embodiments of the subject matter described herein, a filter system includes a body having an inlet and an outlet fluidly coupled with the inlet by one or more passageways within the body. The one or more passageways may be shaped to direct a fluid having particles through the body from the inlet toward the outlet. The one or more passageways may rotate the fluid in one or more cyclonic directions between the inlet and the outlet. A lattice component may be disposed within the one or more passageways. The lattice component may have plural lattice walls defining one or more openings through which the fluid passes as the fluid moves in the one or more cyclonic directions within the body from the inlet to the outlet. The plural lattice walls may be shaped to control a size of the one or more openings between consecutive lattice walls of the plural lattice walls. The one or more passageways may be shaped to remove a first portion of the particles from the fluid, and the lattice component may be shaped to remove a second portion of the particles from the fluid such that the fluid exiting from the body via the outlet has fewer of the particles than when the fluid entered the body via the inlet. The one or more passageways and the lattice component may remove at least 95% of the particles from the fluid such that the fluid exiting the outlet contains 5% of the particles relative to the fluid entering the inlet. Optionally, the filter system may be re-usable such that the lattice and the one or more passageways are configured to be washed to remove the particles removed from the fluid by the one or more passageways and the lattice component. Optionally, one or more surfaces of one or more of the lattice or the one or more passageways may be treated surfaces. A UV light source may direct UV light in a direction toward the one or more treated surfaces of the lattice or the one or more passageways to generate ozone.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The term "lattice" means a structure having a repeating pattern of generally alternating open and closed units, such as generally diagonal strips arranged at opposing angles. Lattice, herein, is inclusive of structural patterns that may be described as "honeycomb" or other repeating geometrical shapes. The open units may themselves be open, or partially open passageways, or closed cells. The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims set forth a patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A filter system comprising:
a body comprising an inlet and an outlet fluidly coupled with the inlet by one or more passageways within the body, the one or more passageways shaped to direct a fluid having particles through the body from the inlet toward the outlet, the one or more passageways configured to rotate the fluid in one or more cyclonic directions between the inlet and the outlet; and
a lattice component disposed within the one or more passageways, the lattice component having one or more openings through which the fluid passes as the fluid moves in the one or more cyclonic directions within the body from the inlet to the outlet,
the one or more passageways shaped to remove a first portion of the particles from the fluid, and the lattice component shaped to remove a second portion of the particles from the fluid such that the fluid exiting from the body via the outlet has fewer of the particles than when the fluid entered the body via the inlet.

2. The filter system of claim 1, wherein the one or more passageways are one or more circular pathways shaped to form a cyclone structure that changes non-cyclonic flow of the fluid entering the body into cyclonic flow of the fluid in the one or more cyclonic directions.

3. The filter system of claim 2, wherein the one or more circular pathways include two or more of the circular pathways that are concentric with each other about a central axis.

4. The filter system of claim 2, wherein the one or more circular pathways include a first circular pathway and a second circular pathway with the first circular pathway radially offset about a central axis from the second circular pathway of the one or more circular pathways.

5. The filter system of claim 1, wherein the one or more passageways are defined by one or more walls, wherein a first portion of the one or more walls are textured to remove a third portion of the particles from the fluid.

6. The filter system of claim 5, wherein a second portion of the one or more walls are not textured to reduce an amount of the first portion of the particles that are removed by the one or more passageways.

7. The filter system of claim 1, wherein the lattice component comprises plural lattice walls between a first end and a second end of the lattice component, wherein the plural lattice walls are configured to direct the fluid in one or more directions through the lattice component and around the plural lattice walls.

8. The filter system of claim 7, wherein the plural lattice walls are configured to contact the at least the second portion of particles disposed within the fluid to separate the at least the second portion of the particles from the fluid, the at least the second portion of the particles having a size smaller than 1 micron.

9. The filter system of claim 7, wherein a first portion of the lattice component includes the plural lattice walls in a first lattice configuration, and a second portion of the lattice component includes the plural lattice walls in a second lattice configuration.

10. The filter system of claim 7, wherein a first portion of the plural lattice walls have a first wall thickness, and a second portion of the plural lattice walls have a second wall thickness that is different than the first wall thickness.

11. The filter system of claim 7, wherein consecutive walls of the plural lattice walls are separated from each other by the one or more openings, wherein the one or more openings have a size in at least one direction of about 20 microns.

12. The filter system of claim 11, wherein the plural lattice walls of the lattice component are arranged in a pattern to control the size of the one or more openings between the consecutive walls of the plural lattice walls.

13. The filter system of claim 1, wherein the body and the one or more passageways are configured to be additively manufactured as a unitary component.

14. The filter system of claim 13, wherein the lattice component is configured to be operably coupled with the unitary component.

15. The filter system of claim 1, wherein the one or more passageways and the lattice component are configured to remove at least 95% of the particles from the fluid such that the fluid exiting the outlet contains no more than 5% of the particles relative to the fluid entering the inlet.

16. The filter system of claim 1, wherein one or more of the one or more passageways or the lattice component are configured to receive an electric current from a source disposed outside of the body, wherein the electric current is configured to change a charge of one or more surfaces of the one or more of the one or more passageways or the lattice component.

17. The filter system of claim 1, wherein the filter system is configured to be transferable from a first position to a second position.

18. A method comprising:
directing a fluid having particles through a body from an inlet toward an outlet fluidly coupled with the inlet by one or more passageways within the body, the one or more passageways configured to rotate the fluid in one or more cyclonic directions between the inlet and the outlet; and
directing the fluid through a lattice component having one or more openings, the fluid configured to move through the one or more openings in the one or more cyclonic directions within the body from the inlet toward the outlet,
the one or more passageways shaped to remove a first portion of the particles from the fluid, and the lattice component shaped to remove a second portion of the particles from the fluid such that the fluid exiting from the body via the outlet has fewer of the particles than when the fluid entered the body via the inlet.

19. A filter system comprising:
a body comprising an inlet and an outlet fluidly coupled with the inlet by one or more passageways within the body, the one or more passageways shaped to direct a fluid having particles through the body from the inlet toward the outlet, the one or more passageways configured to rotate the fluid in one or more cyclonic directions between the inlet and the outlet; and
a lattice component disposed within the one or more passageways, the lattice component having plural lattice walls defining one or more openings through which the fluid passes as the fluid moves in the one or more cyclonic directions within the body from the inlet to the outlet, the plural lattice walls being shaped to control a size of the one or more openings between consecutive lattice walls of the plural lattice walls,
the one or more passageways shaped to remove a first portion of the particles from the fluid, and the lattice component shaped to remove a second portion of the particles from the fluid such that the fluid exiting from the body via the outlet has fewer of the particles than when the fluid entered the body via the inlet, wherein the one or more passageways and the lattice component are configured to remove at least 95% of the particles from the fluid such that the fluid exiting the outlet contains no more than 5% of the particles relative to the fluid entering the inlet.

20. The filter system of claim 19, wherein the filter system is configured to be re-usable such that the lattice and the one or more passageways are configured to be washed to remove the particles removed from the fluid by the one or more passageways and the lattice component.

* * * * *